(12) United States Patent
Guering et al.

(10) Patent No.: US 8,256,711 B2
(45) Date of Patent: Sep. 4, 2012

(54) LANDING GEAR CASING WITH REDUCED SPACE REQUIREMENT

(75) Inventors: Bernard Guering, Montrabe (FR); Laurent Saint Marc, Nerac (FR)

(73) Assignee: Airbus Operations, Toulouse (FR)

( * ) Notice: Subject to any disclaimer, the term of this patent is extended or adjusted under 35 U.S.C. 154(b) by 285 days.

(21) Appl. No.: 12/664,281

(22) PCT Filed: May 28, 2008

(86) PCT No.: PCT/FR2008/050934
§ 371 (c)(1),
(2), (4) Date: Dec. 11, 2009

(87) PCT Pub. No.: WO2009/004200
PCT Pub. Date: Jan. 8, 2009

(65) Prior Publication Data
US 2010/0176240 A1    Jul. 15, 2010

(30) Foreign Application Priority Data
Jun. 15, 2007  (FR) ...................................... 07 04290

(51) Int. Cl.
*B64C 25/10* (2006.01)
*B64C 25/14* (2006.01)
*B64C 25/20* (2006.01)
(52) U.S. Cl. .................................................. 244/102 R
(58) Field of Classification Search .............. 244/102 R, 244/117 R, 100 R, 129.4, 102 A
See application file for complete search history.

(56) References Cited

U.S. PATENT DOCUMENTS

| 2,437,574 | A  | * | 3/1948  | Watter et al. .............. | 244/117 R |
| 8,028,955 | B2 | * | 10/2011 | De Ruffray et al. ...... | 244/102 R |
| 2009/0159743 | A1 | | 6/2009 | Guering et al. | |

FOREIGN PATENT DOCUMENTS

| WO | 2007 057288 | 5/2007 |
| WO | 2007 057400 | 5/2007 |

\* cited by examiner

*Primary Examiner* — Tien Dinh
*Assistant Examiner* — Valentina Xavier
(74) *Attorney, Agent, or Firm* — Oblon, Spivak, McClelland, Maier & Neustadt, L.L.P.

(57) ABSTRACT

The invention relates to a landing gear casing that comprises a longitudinal box with walls defining an inner housing (24) open at the bottom and enabling the stowage of the landing gear (20) inside the housing and the deployment thereof outside the housing, the walls of the casing separating the non-pressurised inner housing from a surrounding pressurised area (18) of the aircraft, characterised in that the casing includes a primary inner frame including: several primary transverse reinforcement arcs (26, 28) inside the housing; at least one longitudinal central reinforcement arc (30a, 30b) inside the housing; wherein the walls of the casing and the reinforcement being adapted to conform to the shapes of the landing gear (20) and the stowage/expansion mechanism (22) thereof.

10 Claims, 3 Drawing Sheets

LANDING GEAR CASING WITH REDUCED SPACE REQUIREMENT

The invention relates to an aircraft landing gear casing.

It is known that the landing gear of an aircraft, for example the front gear, is accommodated, in retracted position, in a box arranged under the floor of the cockpit.

The box isolates the gear from the pressurized portion of the aircraft and therefore is designed to resist the pressure prevailing on board the aircraft.

This box is in the form of a more or less parallelepipedal block, of generally elongated form, comprising several panels assembled together: a longitudinal panel, two vertical side panels and two transverse panels arranged at the two ends of the box that are aligned along the longitudinal dimension thereof, an opening being provided on the side opposite the longitudinal panel.

The box is arranged in inverted form in the manner of a hood with the longitudinal panel arranged on the top and the opening underneath in order to make it possible to retract the landing gear into the box and to extract it therefrom.

A plurality of transverse rigidification ribs are arranged parallel to each other and are fastened to the outer surface of the box so that each forms a portico.

In this structure the panels withstand the stresses due to the pressure and the porticos collect these stresses in order to keep the panels in place.

Such a structure is effective for ensuring the functions of mechanical resistance to the pressure and of transmission to the fuselage of the stresses exerted by the landing gear.

The box, however, occupies a considerable volume in the space where it is installed, which leaves practically no room for accommodating equipment items, for example computers.

This invention seeks to remedy at least one of the aforementioned drawbacks by proposing a landing gear casing comprising a box of longitudinal form comprising walls that define an inner housing open at the bottom in order to allow the retraction of a landing gear inside the housing and deployment thereof outside the housing, the walls of the box separating the non-pressurized inner housing from a surrounding pressurized zone of the aircraft, characterized in that the box comprises a primary inner framework including:
- several primary transverse reinforcement arches inside the housing,
- at least one longitudinal central reinforcement inside the housing, the walls of the box and the reinforcements being configured to conform to the shapes of the landing gear and of its deployment/retraction mechanism.

By virtue of such an inner framework, the box provides a great mechanical resistance to the pressure being exerted thereon and is particularly resistant to the stresses transmitted by the landing gear.

Furthermore, by providing an inner reinforcement framework and by arranging the walls of the box as well as the components of the framework as close as possible around the landing gear and its mechanism for deployment/retraction, the space requirement of the box is reduced.

Therefore, the space freed up by the decrease in volume occupied by the box can be used to house cargo, various equipment items (computers . . . ) therein.

According to one characteristic, the said at least one longitudinal central reinforcement connects the transverse reinforcement arches of the framework with each other so as to make the latter more sturdy.

According to one characteristic, the said at least one longitudinal central reinforcement is arranged so as to be positioned between two wheels of the landing gear when the latter is retracted, which makes it possible to bring the walls of the box as close as possible to the wheels of the landing gear and thus to reduce the space requirement of the box even more.

According to one characteristic, the longitudinal central reinforcement has a curved upper part following the same curvature as that of the wheels of the landing gear, in this way making it possible to conform to the shape of the latter.

When the reinforcement is arranged between the wheels of the landing gear, its angular sector shape allows it to fit perfectly into the outer contour of the wheels.

According to one characteristic, the transverse reinforcement arches each have a general inverted U shape so as to surround on three sides, as closely as possible, the portion of the landing gear and/or its deployment/retraction mechanism situated at the base of the reinforcement.

This arrangement thus makes it possible to bring the walls of the box as close as possible to the landing gear and its mechanism in order to obtain a box with reduced dimensions.

According to one characteristic, the walls of the box are structured so as to form several successive sections supported by the primary inner framework, each of the sections having a shape adapted to the shape of the portion of the landing gear and/or its deployment/retraction mechanism surrounded by the section.

The configuration of the box in sections makes it possible to simplify the manufacture thereof by enveloping various specific portions of the landing gear and of its mechanism inside sections of simple but suitable shapes. In a way, an approximation of facets of the complex shape of the outer covering of the gear and of its mechanism is produced by a plurality of successive sections each having a simple geometric form.

Thus there is a front section having a curved upper wall for conforming to a portion of the contour of the wheels of the landing gear.

In addition, additional sections are provided behind the front section to encompass two other specific portions of the landing gear and of its mechanism, namely a rear section having a sloping upper wall and an intermediate section arranged between the front section and the rear section and provided with an upper wall.

The upper wall of the intermediate section is, for example, arranged at a level higher than that of the sloping upper wall of the rear section.

The upper wall of the intermediate section is, for example, horizontal so as to constitute a work surface for the personnel in charge of maintenance in the space surrounding the box.

Furthermore, according to another characteristic, a vertical recess is provided between the lower rear section and the upper intermediate section.

According to one characteristic, the upper walls of the box have smooth outer faces that facilitate intervention by the maintenance personnel around the box.

According to one characteristic, the primary transverse reinforcement arches form separating walls between the sections.

According to one characteristic, the box comprises inner lateral longitudinal reinforcements that are parallel to the longitudinal central reinforcement of the primary framework and connecting the transverse reinforcement arches of the primary framework to each other.

According to one characteristic, secondary transverse reinforcements inside the box can be provided and arranged parallel to the primary transverse reinforcement arches.

According to one characteristic, the gear casing according to the invention can comprise a front frame and a rear frame serving as front and rear walls of the box situated at the two opposite longitudinal ends thereof.

In this configuration, the front frame is arranged on the side of the box where the wheels of the landing gear are accommodated and comprises two parts:
- a lower part forming the front wall of the box and which is arranged parallel to the tangent to the trajectory of the wheels and
- an upper part sloping in relation to the lower part so as to move away from the box.

The broken configuration of the front frame makes it possible to save even a little more space in the area surrounding the box as compared with a front frame the lower and upper parts of which would be aligned with one another.

The invention also relates to an aircraft that comprises a landing gear casing according to the brief explanation above.

According to one characteristic, on the outside of the box, mechanisms for vertical stabilization of the walls of the box, for example connecting rods, rest on the one hand on a wall of the box and, on the other hand, on the inner wall of the fuselage of the aircraft.

These mechanisms are, for example, arranged at the plane of the upper wall of the box, that is, in the plane of this wall.

The arrangement of these mechanisms in the upper part of the box is advantageous insofar as these mechanisms have fewer stresses to produce than if they were arranged in the lower part of the box. In addition, arranged in this way, they are more accessible for possible maintenance operations than if they were arranged in the lower part.

According to one characteristic, on both sides of the box, at least one panel or partition extends longitudinally between the vertical longitudinal walls of the box and the inner wall of the fuselage.

These external reinforcement panels serve to prevent the walls of the box, in particular the vertical walls thereof, from becoming deformed in the course of time depending on the stresses to which they are subjected.

Other characteristics and advantages will become apparent in the course of the description that is going to follow, provided solely by way of non-limitative example and presented with reference to the attached drawings, on which:

Figure 1:
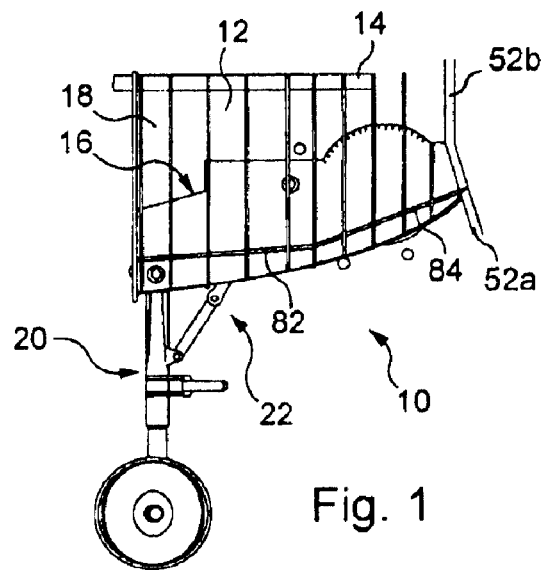
FIG. 1 is a general schematic view of the landing gear casing according to the invention with the landing gear extended.

As shown at FIG. 1 and designated by the general reference marked 10, a front portion of an airplane comprises a space 12 situated at the front of the aircraft below a floor 14, for example the floor of the cockpit.

This space contains a landing gear casing 16 for accommodating the front landing gear during the flight of the aircraft.

A pressurized zone 18 situated beneath floor 14 surrounds gear casing 16.

In the position of FIG. 1, landing gear 20 is shown in deployed position with a portion of its deployment and retraction mechanism 22.

Figure 2:
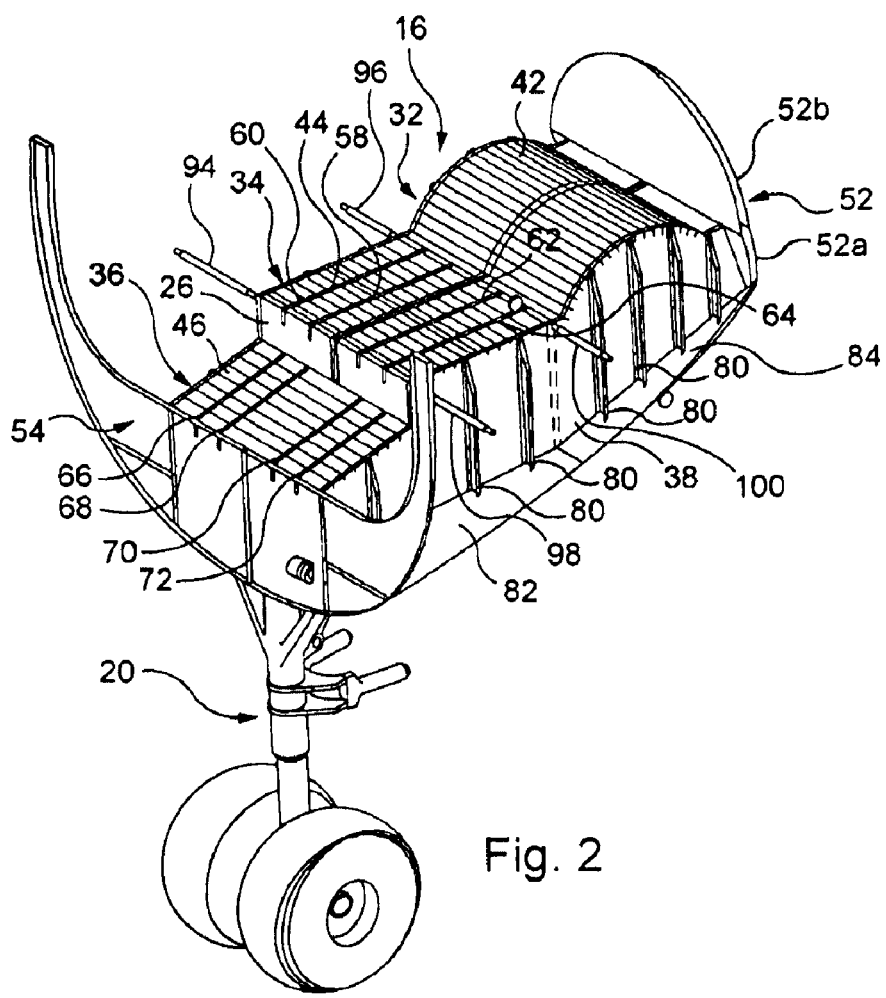
FIG. 2 is a general perspective view from above of the gear casing of FIG. 1.

FIG. 2 shows in perspective gear casing 16 with landing gear 20 extended, without floor 14.

Gear casing 16 comprises a box having a longitudinal form corresponding to the longitudinal axis of the aircraft along which gear 20 is retracted.

Box 16 is closed on the top and on the sides so as to isolate external pressurized zone 18 of the aircraft from the interior of the non-pressurized box.

The box comprises vertical upper and side walls that form the outer covering of the box and define an inner housing 24 open at the bottom in order to allow the retraction of the landing gear into the housing (FIG. 4) and deployment thereof (FIGS. 1 and 2).

Figure 4:
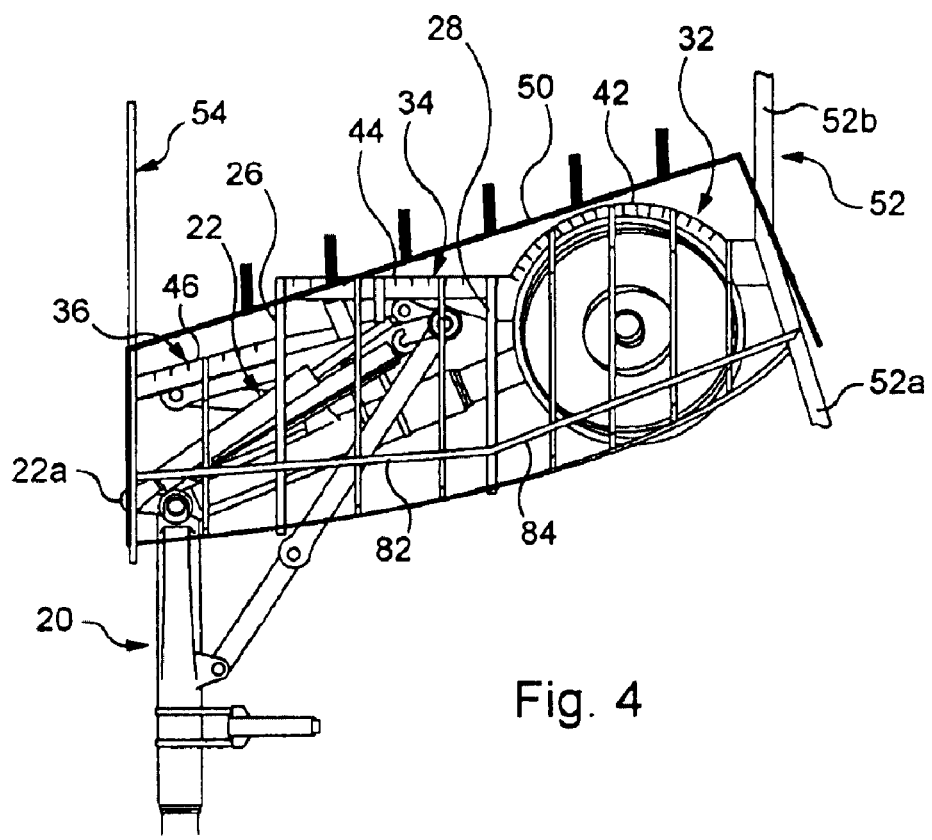
FIG. 4 is a schematic view in longitudinal section of the gear casing of the preceding Figures with the landing gear shown in the two extreme positions.

It should be noted that on FIG. 4, the two extreme positions of the landing gear and of its deployment/retraction mechanism have been shown in solid lines.

The box comprises an inner framework, called a primary framework, which comprises several primary transverse reinforcement arches inside housing 24.

Figure 3:
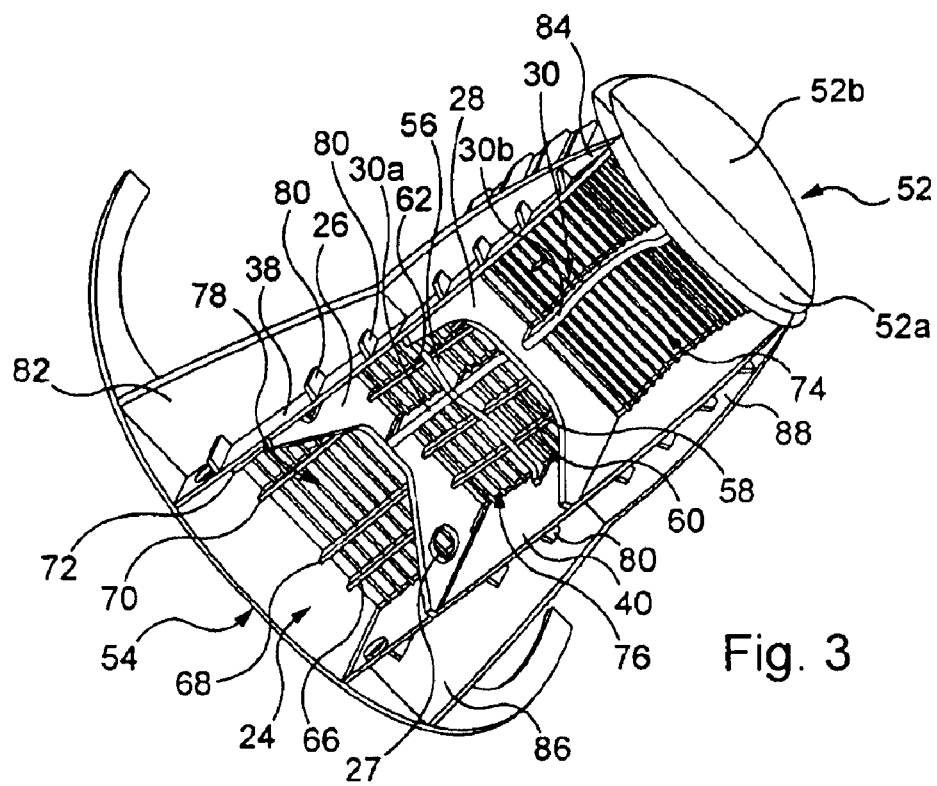
FIG. 3 shows, in a view from below, the inside of the gear casing of FIG. 2 without the landing gear.

The exemplary embodiment illustrated on the Figures has two reinforcement arches 26, 28 that are fastened to the inner faces of the walls of the box (FIG. 3).

The inner framework also comprises at least one longitudinal central reinforcement 30 inside the housing and which also is fastened to the inner faces of the walls of the box.

As shown on FIG. 3, longitudinal reinforcement 30 connects transverse reinforcement arches 26 and 28 with one another and extends longitudinally in the front portion of the gear casing.

In the exemplary embodiment, reinforcement 30 is produced in two parts, a first part 30a that connects transverse reinforcements 26 and 28 to one another and a second part 30b that extends toward the front from transverse reinforcement 28.

As shown on FIGS. 2 to 4, the walls of the box follow the outer contour of the landing gear and of its retraction/deployment mechanism as closely as possible so as to generate a minimal external space requirement for the gear casing.

In addition, the various transverse and longitudinal reinforcements possess a configuration particularly adapted for conforming to the shapes of the landing gear and of its deployment/retraction mechanism.

To accomplish this, the various reinforcements of the primary inner framework have a concave shape adapted to the shape of the portion of the gear and/or of its mechanism 22 at the base of which they are positioned.

Thus, for example, transverse reinforcement arches 26 and 28 each have a general configuration in the shape of an inverted U so as to surround as closely as possible on three sides (upper part and side parts) the affected part of the gear and/or of its mechanism situated to the right of the reinforcement.

It will be noted that arches 26 and 28 have a relatively large transverse dimension so as to increase the inertia of the arches.

Furthermore, an oblong hole 27 is implemented in one of the props of arch 26 (FIG. 3) so as to be traversed by a jack referred to as a lifting jack for mechanism 22.

In addition, the elongated shape of the hole allows clearance of the jack during activation of the landing gear between its two extreme positions shown on FIG. 4.

So that the box will have a shape that is adapted as closely as possible to the shape of the landing gear and of its deployment/retraction mechanism, the box is structured in several successive sections of simple shapes each adapted to the shape of a specific zone of the gear and/or of its mechanism.

There are seen on FIGS. 2 and 4 three successive sections that are supported by the inner framework shown at FIG. 3 and each configured to follow the outer contour of a portion of the landing gear and/or of its deployment/retraction mechanism.

The walls of box 16 thus are structured so as to form successively a front section 32 situated at the front end of the box and at the base of the wheels of the landing gear when the latter is in retracted position (FIG. 4), an intermediate section 34 arranged immediately upstream from front section 32 and which is situated at the base of a first part of the deployment/retraction mechanism of the gear and a rear section 36 arranged immediately upstream from intermediate section 34 and which is situated at the base of a second part of mechanism 22.

These sections are delimited among themselves by the two transverse reinforcements 26 and 28 of the inner framework shown at FIG. 3 and which thus partially separate two adjacent sections.

The sections are delimited externally by vertical side walls 38 and 40 of the box and by upper walls 42, 44 and 46 that constitute the upper part of the box.

As shown on FIGS. 1, 2 and 4, the upper walls of the box have smooth outer faces, unlike the box of the prior art shown superposed at FIG. 4, by reference 50.

These smooth upper faces facilitate the arrangement of the space of the pressurized zone surrounding the box and also make maintenance operations in this zone easier.

It will be noted that the upper wall of the box at the intermediate section is flat and horizontal so as to set up a flat ergonomic surface for maintenance operations.

The sloping flat surface of upper wall 46 of the rear section also facilitates human interventions around the box.

Upper wall 42 of front section 32 has a convex curvature turned toward the outside of the box so as to conform to the upper contour of the wheels of the landing gear.

Furthermore, longitudinal central reinforcement 30b fastened to upper wall 42 has a curvature with a concavity turned toward the inside of the box, which allows it to be positioned between the two wheels of the landing gear when the latter is retracted (FIG. 4).

In this way the wheels can be placed as close as possible to the surface of the inner face of wall 42, as shown on FIG. 4, in order to reduce the space requirement.

It will be noted that the upper wall of intermediate section 34 is arranged at a side above that of upper wall 46 of rear segment 36 and that in this way a vertical recess between these two adjacent sections is produced.

This recess is produced by virtue of transverse reinforcement 26 that is extended upward beyond upper wall 46, this extension also forming an outer part of the box.

The structure of the box is simplified since the extension of transverse reinforcement 26 to the outside of the box makes it possible to avoid having to add an additional piece to form a recess at the outer covering of the box.

Furthermore, the box is closed at its two front and rear longitudinal ends by a front frame 52 and a rear frame 54.

Front frame 52 is arranged in the part of the fuselage situated at the front of the aircraft and which therefore is narrowed. This frame has a more or less circular shape and is made up of two parts, a lower part 52a and an upper part 52b, each of half-moon shape.

Lower part 52a constitutes a front wall of the box and is arranged parallel to the tangent to the trajectory of the wheels of the landing gear in order not to interfere with the latter during movement thereof.

Upper part 52b is sloping in relation to lower part 52a moving away from the box, this to provide an additional saving of flexible space that can be arranged around the box (FIGS. 1 and 4).

Rear frame 54 has a general shape of a U open toward the top and the base of the U serves as a rear wall closing the box (FIGS. 2 and 3).

It will be noted that rear frame 54 is provided with an opening the dimensions of which are slightly greater than those of end 22a of the lifting jack for mechanism 22 of the landing gear mentioned above.

This arrangement in the wall of the rear frame favors the vertical clearance of the end of the jack during the movement of deployment and retraction of the gear.

Furthermore, an impervious hood, not shown, is fastened around the opening so as to close off the latter.

In addition to longitudinal longeron 30 (for example implemented in two parts 30a and 30b screwed onto the transverse arcs) and transverse reinforcement arches 26 and 28, the structure serving as support inside the box comprises an intermediate transverse reinforcement arch 56 arranged in the intermediate section between the two arches 26 and 28.

Several longerons arranged longitudinally parallel to central reinforcement 30, are fastened onto the inner faces of upper walls 44 and 46 of intermediate and rear sections 34 and 36 (FIGS. 2 and 3).

On FIG. 2 showing the box in a perspective view from above, the various reinforcements have been materialized for purposes of explanation but they are not visible from the outside of the box.

Thus four longitudinal reinforcement beams are counted in the intermediate section, arranged two by two on both sides of longeron 30a, namely beams 58 and 60 and beams 62 and 64 (FIGS. 2 and 3).

In the rear section four longitudinal beams are arranged parallel to each other, namely beams 66, 68, 70 and 72.

A plurality of transverse reinforcements also are arranged in each section of the box parallel to each other and are shown on FIGS. 2 and 3 (on FIG. 2 they also are materialized but are not visible from the outside of the box).

There thus are seen a first plurality of transverse reinforcements 74 arranged at the upper wall of the front section, a second plurality 76 of transverse reinforcements arranged at the upper wall of the intermediate section and a third plurality 78 of transverse reinforcements arranged at the upper wall of the rear section.

For example, these additional transverse reinforcements inside the box are built into the panels constituting the upper walls of the box in order to simplify manufacture.

It will be noted that side walls 38 and 40 of the box are provided with vertical external tighteners 80 that additionally reinforce the structure of the box on the sides thereof and not on the top in order to limit the external space requirement of the box.

These tighteners extend crosswise over the entire height of the box but have a small extension size perpendicular to walls 38, 40.

An additional reinforcement structure moreover is provided at the lower part of the box in the form of one or more panels arranged on both sides the said box, longitudinally, so as to prevent a deformation of side walls 38 and 40 of the box.

In the exemplary embodiment, this additional structure is implemented in the form of four longitudinal panels extending two by two on both sides of the side walls of the box, the two panels situated on a same side of the box being fastened at the end of one another, as shown on FIG. 3 by panels 82 and 84 situated in the extension of one another and likewise for panels 86 and 88 arranged on the opposite side.

These panels are streamlined so as to take into account the reduction in diameter of the fuselage when going from rear frame 54 toward front frame 52.

Figure 5:
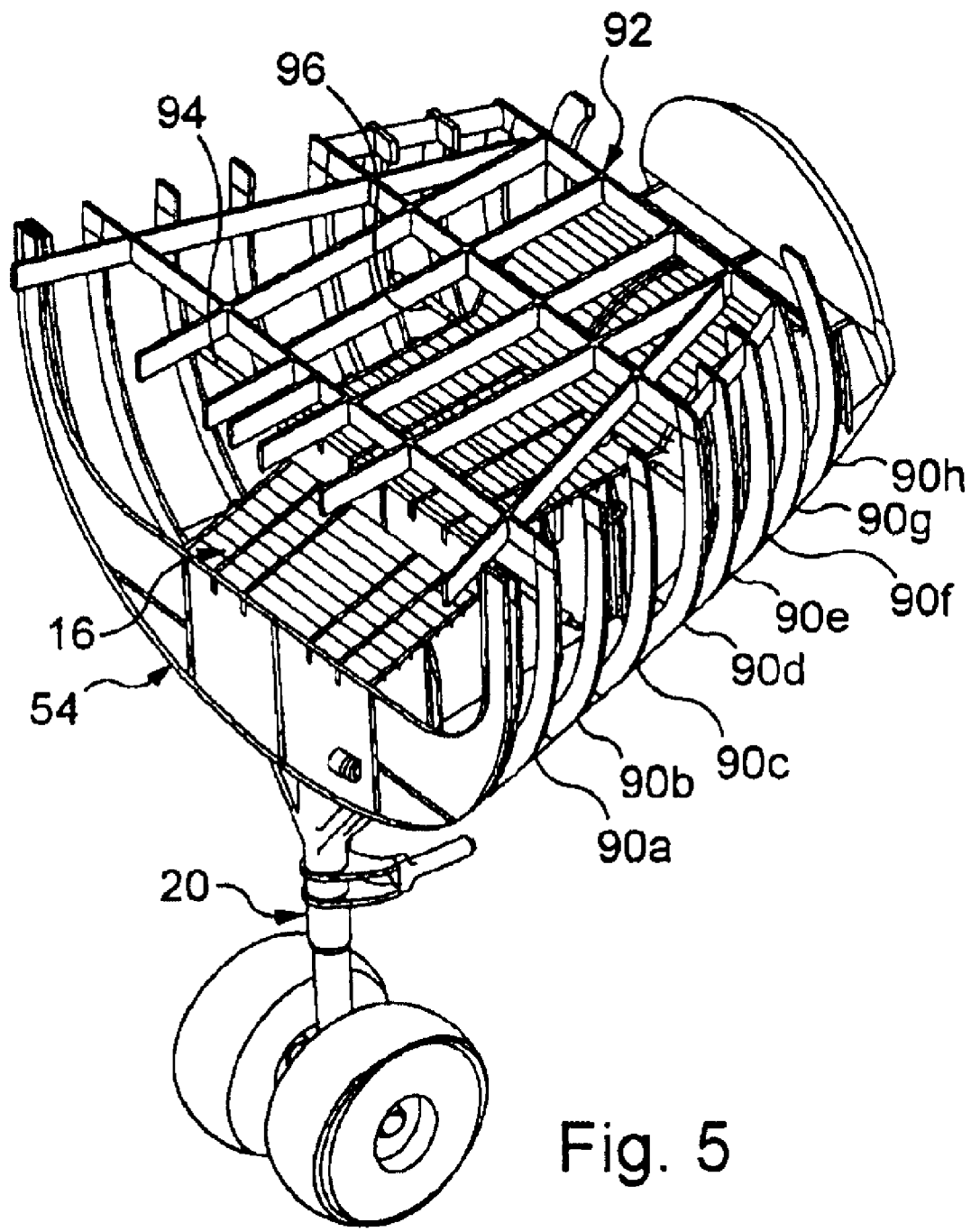
FIG. 5 illustrates schematically in perspective the structures of the aircraft surrounding the gear casing according to the invention.

These panels arranged perpendicular to the faces of side walls 38 and 40 of the box are fastened to the latter and serve as a link with the inner wall of the fuselage and its structure which is illustrated on FIG. 5.

On this Figure, frames 90a, 90b, 90c, 90d, 90e, 90f, 90g and 90h of the inner structure of the fuselage, as well as framework 92 of floor 14 of FIG. 1, have been shown schematically.

Outside box 16, several vertical stabilization mechanisms for the walls of the box are provided.

These mechanisms are positioned between the box and the inner wall of the fuselage so as to rest on one and the other and thus to stabilize the walls of the box vertically.

These mechanisms preferably are positioned in the upper portion of the box, in order, on the one hand, to receive lesser stresses than in the lower part and, on the other hand, to facilitate maintenance operations.

These mechanisms are, for example, implemented in the form of connecting rods 94, 96, 98, 100 arranged two by two on both sides of the box, as shown on FIG. 2.

These connecting rods are arranged horizontally at the plane of the upper wall of the box.

For example, these mechanisms are arranged at the plane of upper wall 44 of the intermediate section and are arranged crosswise in the transverse vertical plane of transverse reinforcements 26 and 28 where most of the stresses exerted on the box are taken up.

FIG. 5 illustrates the arrangement of two, 94, 96 of the four vertical stabilization mechanisms of the box between the walls thereof and frames 90a-h of the fuselage.

The invention claimed is:

1. A landing gear casing comprising:
a box of longitudinal form comprising walls that define an inner housing open at the bottom in order to allow the retraction of a landing gear inside the housing and deployment thereof outside the housing, the walls of the box separating the non-pressurized inner housing from a surrounding pressurized zone of the aircraft, the box including a primary inner framework comprising:
two primary transverse reinforcement arches inside the housing, and
at least one longitudinal central reinforcement inside the housing and extending along a central longitudinal axis of the housing, the walls of the box and the reinforcements being configured to conform to the shapes of landing gear and of its deployment/retraction mechanism.

2. The landing gear casing according to claim 1, wherein the said at least one longitudinal central reinforcement connects the transverse reinforcement arches.

3. The landing gear casing according to claim 1, wherein transverse reinforcement arches each have a general inverted U shape so as to surround as closely as possible, on three sides, the portion of the landing gear and/or of its deployment/retraction mechanism situated at the base of the reinforcement.

4. The landing gear casing according to claim 1, wherein the walls of the box are structured so as to form several successive sections supported by the primary inner framework, each of the sections having a shape adapted to the shape of the portion of the landing gear and/or of its deployment/retraction mechanism surrounded by the section.

5. The landing gear casing according to claim 1, wherein upper walls of the box have smooth outer faces.

6. The landing gear casing according to claim 1, further comprising:
a front frame and a rear frame serving as front and rear walls of the box situated at the two opposite longitudinal ends thereof, front frame being arranged on the side of the box where the wheels are accommodated and comprising two parts:
a lower part forming the front wall of the box and which is arranged parallel to the tangent to the trajectory of the wheels and,
an upper part slanting in relation to the lower part so as to move away from the box.

7. An aircraft comprising a landing gear casing according to claim 1.

8. The aircraft according to claim 7, wherein, on the outside of the box, vertical stabilization mechanisms for the walls of the box rest on the one hand on a wall of the box, and on the other hand on the inner wall of the fuselage of the aircraft.

9. The aircraft according to claim 7, wherein, on both sides of the box, at least one panel extends longitudinally between the vertical longitudinal walls of the box and the inner wall of the fuselage.

10. A landing gear casing comprising:
a box of longitudinal form comprising walls that define an inner housing-open at the bottom in order to allow the retraction of a landing gear inside the housing and deployment thereof outside the housing, the walls of the box separating the non-pressurized inner housing from a surrounding pressurized zone of the aircraft, the box including a primary inner framework comprising:
several primary transverse reinforcement arches inside the housing, and
at least one longitudinal central reinforcement inside the housing, the walls of the box and the reinforcements being configured to conform to the shapes of landing gear and of its deployment/retraction mechanism, the said at least one longitudinal central reinforcement positioned between two wheels of the landing gear when the latter is retracted.

* * * * *